United States Patent [19]

Fedor

[11] 3,998,599
[45] Dec. 21, 1976

[54] SYSTEM FOR CATALYTIC REDUCTION OF $NO_x$ EMANATING FROM AN INTERNAL COMBUSTION ENGINE

[75] Inventor: Robert Joseph Fedor, Westlake, Ohio

[73] Assignee: Gould Inc., Rolling Meadows, Ill.

[22] Filed: Jan. 23, 1976

[21] Appl. No.: 651,628

Related U.S. Application Data

[63] Continuation of Ser. No. 507,748, Sept. 20, 1974, abandoned, which is a continuation-in-part of Ser. No. 249,884, May 3, 1972, abandoned.

[52] U.S. Cl. .................. 23/288 FC; 23/288 FB; 60/301; 252/477 R
[51] Int. Cl.² .................. B01J 8/00; F01N 3/15
[58] Field of Search ..... 23/288 R, 288 FB, 288 FC; 60/299, 301; 423/213.2, 213.5, 213.7; 252/477 R

[56] References Cited

UNITED STATES PATENTS

| | | | |
|---|---|---|---|
| 1,326,767 | 12/1919 | Moore | 23/288 R X |
| 1,895,642 | 1/1933 | Preble | 55/487 |
| 2,341,097 | 2/1944 | Heebink | 55/487 |
| 2,607,663 | 8/1952 | Perry et al. | 23/288 R |
| 2,720,494 | 10/1955 | Suter et al. | 23/288 FG UX |
| 2,862,354 | 12/1958 | Barnhart | 23/288 F UX |
| 2,995,199 | 8/1961 | Myers | 23/288 F UX |
| 3,124,930 | 3/1964 | Powers | 23/288 FC UX |
| 3,270,798 | 9/1966 | Ruff | 23/288 FC UX |
| 3,425,216 | 2/1969 | Bjork | 23/288 F X |
| 3,434,826 | 3/1969 | Holzmann | 23/288 R UX |
| 3,447,316 | 6/1969 | White | 23/288 R X |
| 3,546,075 | 12/1970 | Sheetz et al. | 29/180 SS X |
| 3,718,733 | 2/1973 | Gehri | 23/288 FB X |
| 3,768,981 | 10/1973 | Alliger | 23/288 F |
| 3,773,894 | 11/1973 | Bernstein et al. | 23/288 FB X |

*Primary Examiner*—Barry S. Richman
*Attorney, Agent, or Firm*—Edward E. Sachs

[57] ABSTRACT

A system for reducing $NO_x$ gases found in the exhaust stream of the internal combustion engine is provided which includes an internal combustion engine having associated therewith a means for supplying fuel and oxygen to the engine, a manifold system for directing or channeling the exhaust gases from the engine, and a $NO_x$ reducing catalyst assembly communicating with the manifold which includes a housing having a $NO_x$ reducing catalytic structure of apertured thin metal foil positioned therein which includes, in one aspect, a plurality of sheets of expanded metal foil wherein at least one sheet of expanded metal foil has at least some openings therein which are of a different size than at least some openings in a juxtapositioned sheet of expanded metal foil. In another aspect, it includes a sheet of expanded metal foil having at least some openings of different sizes.

10 Claims, 10 Drawing Figures

SYSTEM FOR CATALYTIC REDUCTION OF NO$_x$ EMANATING FROM AN INTERNAL COMBUSTION ENGINE

The application is a continuation of application Ser. No. 507,748, filed Sept. 20, 1974 and now abandoned, which is in turn a continuation-in-part of application Ser. No. 249,884, filed May 3, 1972 and now abandoned.

This invention relates to a system of operating an internal combustion engine and includes the use of a special catalytic structure capable of reducing oxides of nitrogen, especially nitric oxide and nitrogen dioxide (herein collectively referred to as NO$_X$), which are found in the exhaust gases emanating from the internal combustion engine.

More particularly, the subject invention is directed to the art of emission control devices and includes an improved article, of a suitable metallurgical composition, whose structure is particularly suited for reducing oxides of nitrogen which are commonly found in automotive exhaust gases. In one aspect, the subject invention concerns a catalytic structure which can be mounted in the exhaust system of an internal combustion engine and which is characterized by its efficacy in reducing the oxides fo nitrogen at temperatures of about 1100° F and above.

DESCRIPTION OF THE PRIOR ART

The exhaust stream emanating from an internal combustion engine typically contains many undesirable gases. Some of the more harmful and annoying of these gases include carbon monoxide, unburned hydrocarbons, and the oxides of nitrogen.

Much current development work is being directed to metallurgical systems for the removal of carbon monoxide and unburned hydrocarbons by thermal or catalytic oxidation. The elimination or diminution of oxides of nitrogen is being accomplished by catalytic reduction. With particular regard to the oxides of nitrogen, it is presently desired to eliminate at least 90% of the NO$_X$ issuing from the typical internal combustion engine, using the 1971 model vehicle as the base. Most of such systems are fabricated into Berl saddle type structures, while others are composed of metal catalysts supported by ceramic substrates.

The prior art discloses many catalysts which are, at least in theory, capable of reducing NO$_X$ to less harmful substances. However, the prior art does not contain any reference or teaching which discloses how the various catalysts can be incorporated in a device so that their efficacy is sustained for a useful time period. It is presently believed that, at least in part, these deficiencies are due to the structural characteristics of these metallurgical systems, and particularly the geometric configuration thereof.

An extensive analysis of various catalytic structures, and problems pertaining thereto, was published by the Society of Automotive Engineers on July 11, 1971, entitled "NO$_X$ Reduction Catalyst for Vehicle Emission Control", under SAE, paper No. 710291. This paper includes the disclosure of a composite of copper and stainless steel in the form of wire mesh screen. Still other approaches are indicated in U. S. Pat. No. 3,565,574 and British Pat. No. 1,058,706. The latter patent discloses a ceramic substrate on which is coated a NO$_X$ reducing material.

A major disadvantage of these, and other, prior catalyst structures has been a low surface area to mass ratio. As a consequence, the time required to bring the structures up to operating temperature is comparatively long. Throughout this warm-up period emission of unreduced oxides of nitrogen takes place. Moreover, generally speaking, for a given mass of structure, the greater the area of catalytically active surface presented to the exhaust stream, the more efficient the reduction process. Consequently, structures which embody a low surface area to mass ratio will not perform as effectively as would be the case should be ratio be increased.

Attempts to increase the gross surface area of the structure usually result in a larger catalytic mass which has the effect of increasing the warm-up period, with consequent reduction in catalyst efficiency. Further, the introduction of increased mass into the exhaust stream produces an undesirable obstruction to the flow of gases through the system, thus generating build-up in back pressure which adversely affects the operation of the engine.

The subject invention aids in overcoming the above discussed problems associated with prior devices and provides an efficient, durable NO$_X$ reducing catalytic structure capable of operating for extended periods of time with a high degree of efficacy and low back-pressure biuld up. Structures formed in accordance with the invention can provide a high surface area to mass ratio.

In addition, the subject invention provides an improved system for reducing NO$_X$ gases emanating from the internal combustion engine which utilizes a special form of catalyst structure.

SUMMARY OF THE INVENTION

According to one aspect of the invention, a system for reducing NO$_X$ gases found in the exhaust stream of the internal combustion engine is provided which includes an internal combustion engine having associated therewith a means for supplying fuel and oxygen to the engine, a manifold system for directing or channeling the exhaust gases from the engine, and a NO$_X$ reducing catalyst assembly communicating with the manifold which includes a housing having a NO$_X$ reducing catalytic structure of apertured thin metal foil positioned therein which comprises a unique substrate of corrosion resistant material having on at least one surface, an effective amount of a NO$_X$ reducing catalyst selected from the group consisting of iron, nickel, cobalt, copper, manganese and mixtures thereof.

According to another aspect, the present invention contemplates an article for reducing the oxides of nitrogen in exhaust gases from an internal combustion engine and comprises a catalytic structure adapted to be placed in a housing through which the exhaust gases flow. The structure is sized so that a major portion of the gases passing through the housing must pass through the structure. the structure includes an apertured, thin metal foil of a material effective catalytically to reduce NO$_X$.

Preferably, and in accordance with a more limited aspect of the invention, the foil has a surface area to mass ratio in the range of approximately 2 to 16 square inches per gram. This area is determined by linear dimension only, which is to say that the measurement excludes the additional surface area defined by peaks and valleys obtained through surface treatment. This additional surface area can be obtained, if desired, through the use of conventional techniques for roughening the surface of the foil. As is apparent, ratios of this magnitude promote rapid heat-up, increased efficiency and minimization of back-pressure build-up.

It is also contemplated that the foil will preferably be expanded to provide an open mesh structural configuration, and will be tightly wound in a plural layer helical coil. Additionally, the portions of material between the openings in the expanded foil are twisted and/or inclined relative to the mean plane of the foil sheet. Thus, when assembled into a plural layer sturcture, an extremely tortuous, circuitous path with substantial impingement and scrubbing of the gases against the catalytic surfaces of the foil is assured. Moreover, the resulting structure can have a density of in the range of only 2 to 12 percent of an equivalent solid volume of the foil material.

It is, of course, to be understood, that the metal foil is formed from a metal or alloy having particularly good corrosion resistance and high temperature strength. For example, a corrosion resistant nickel base foil has been used for the substrate and a $NO_x$ reducing catalyst selected from the grouping consisting of iron, nickel, cobalt, copper, manganese and mixtures thereof have been metallurgically bonded to the substrate. Other types of foils formed from different substrates and reducing catalysts have been proposed. these various substrate-catalyst combinations are disclosed and claimed in the commonly assigned, copending U.S. patent applications, Ser. Nos. 453,576, 451,032; 466,965, 467,106 and 457,101.

Various more limited aspects of the invention contemplate that the catalytic structure can be formed in several different configurations. For example, the catalytic mass can be formed by coiling the expanded metal foil tightly around a central mandrel of small diameter. Alternatively, the catalytic structure can be a hollow, tightly wound coil and positioned in the housing so that the gas flows radially through the wound coil. In both of these configurations a multiplicity of relatively circuitous gas flow paths are provided.

It is also contemplated that the layers can be individual separate sheets merely stacked tightly in the housing. The catalytic structure irrespective of its particular form should desirably substantially completely fill the cross-section of the housing so that the majority of all gas passing through the housing must pass through the catalytic structure.

Tests have shown that structures of the type herein set forth have significant advantages over other types of catalytic structures such as screen, saddles, or the like. It is possible, although this has not as yet been established, that such advantages are derived from the fact that an expanded metal provides, in addition to a ratio of low mass to high surface area, a structure in which the gases which pass through the openings are deflected by the sharp edges, thereby increasing the contact between the gas and the metal foil.

As will be appreciated from the drawings, the diamond shaped pattern provides for a structural relationship in which the majority of the surface extends angularly to the plane of the structure as a whole and each leg of the diamond again has an angular relationship to the adjacent legs of the same diamond as well as to the contiguous diamonds. This pattern, it is believed, in conjunction with the increased surface area, appears to establish the proper environment for the gaseous material so that the metallurgical system of which the structure is composed, can suitably interact with the gases.

In practice, when forming a catalytic structure according to the teachings of the present invention, care should be taken to minimize the likelihood that strands of juxtapositioned layers of expanded catalyst material become nested in or stacked on top of each other, as such stacking or nesting obviously reduces catalyst efficiency. The proper spacing between the layers can be accomplished by a number of techniques. One approach which has been highly successful in this regard is to take at least two sheets of catalyst coated expanded metal foil having different size openigs therein (usually diamond shaped openings), place one sheet of foil on top of the other, and then form these two sheets of expanded metal into the desired configuration (e.g., a helical coil). This technique enchances the operation of the resultant catalytic structure, whether it be in the form of a helical coil, a series of stacked sheets of material, or the like. Another technique which has been employed to avoid stacking or nesting problems is to distort a sheet of expanded catalyst material so that it has openings of various sizes therein. This is accomplished, for example, by applying a suitable tensional force to the distant ends of a sheet of uniformly expanded metal which causes the strands that define the openings in the sheet of expanded metal to stretch unevenly thereby forming different size openings therein. This sheet of expanded metal foil is then formed into the desired shape or configuration, for example, a helical coil or stacked sheets of material.

Accordingly, the main object of the invention is the provision of an improved catalytic structure exhibiting high efficiency and durability with low back-pressure.

A further object of the invention is the provision of an apparatus of the general type described whterein the catalytic structure comprises a self-sustaining assembly of expanded metal foil.

Yet another object is a provision of a $NO_x$ reducing structure capable of prolonged operation at high temperatures without loss of efficiency or build up of back-pressure.

A still further object of the invention is to provide a system for catalytically reducing $NO_x$ found in the exhaust gases of the internal combustion engine.

The above and other objects and advantages will become apparent from the following description when read in conjunction with the accompanying drawings.

BRIEF DRESCRIPTION OF THE DRAWINGS

DESCRIPTION OF THE PREFERRED EMBODIMENTS OF THE INVENTION

Figure 1:
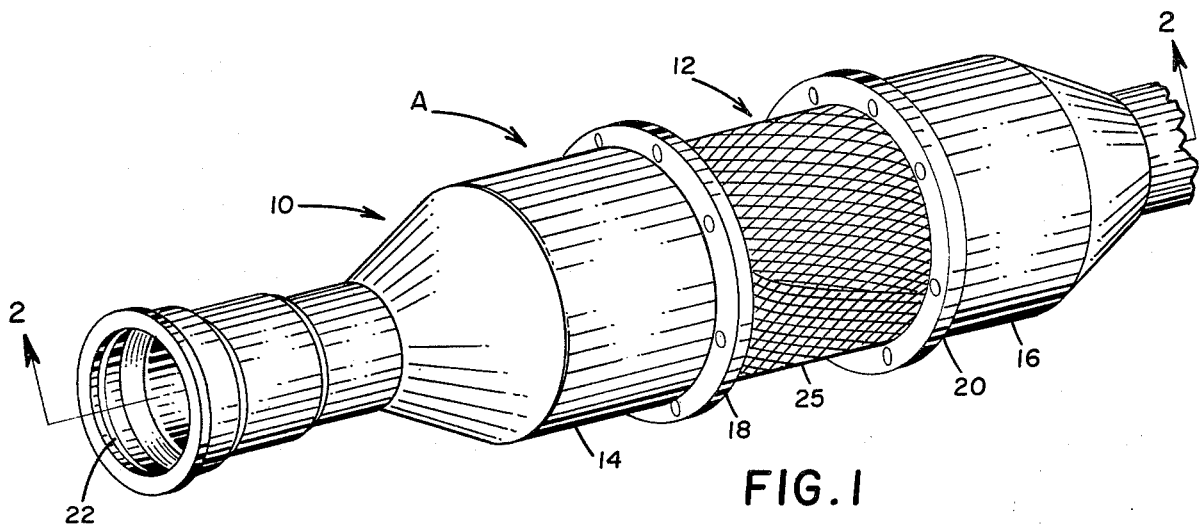
FIG. 1 is an exploded pictorial view showing a $NO_x$ reducing catalyst structure formed in accordance with the preferred embodiment of the invention.
Figure 2:
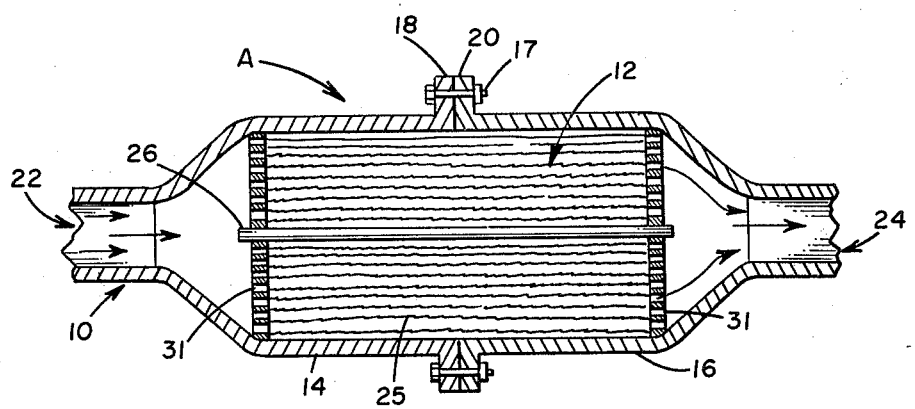
FIG. 2 is a longitudinal cross-sectional view through the device of FIG. 1 showing the device in assembled relationship (the view is taken on line 2—2 of FIG. 1)

Referring more particularly to the drawings wherein the showings are for the purpose of illustrating preferred embodiments of the invention only and not for the purpose of limiting same, FIGS. 1 and 2 show the overall arrangement of a $NO_x$ reducing assembly A which includes a housing 10 adapted to be mounted in the exhaust system of an internal combustion engine. Carried within the housing 10 is the catalytic structure 12. In the embodiment under consideration, structure 12 is sized and located in the housing 10 in a manner such that all, or substantially all, of the gas passing through the housing is required to pass through the catalytic structure 12.

The actual structural configuration and details of the housing 10 are not particularly critical to the invention and many different types of housings could be used. In the subject embodiment, however, housing 10 comprises a pair of generally bell-shaped sections 14 and 16 which are separably joined by suitable bolts 17 which interconnect mating flanges 18 and 20. Bell sections 14 and 16 together define a flow passage having inlet and outlet openings 22, 24, respectively. In the embodiment shown, inlet and outlet openings 22, 24 are arranged to receive the exhaust pipes of an internal combustion engine. It should be understood that the material from which the housing is formed could vary widely provided it has the necessary strength and durablility to withstand the operating conditions and temperatures which may be as high as 1100° F to 1700° F.

Positioned within housing 10 is the catalytic structure 12. According to the invention, the structure 12 comprises a mass of thin, apertured metal foil which in relatively tightly compacted. In the subject embodiment, the foil is an expanded metal foil 25 which is wound tightly upon a small steel mandrel 26 to a diameter to be closely received within the housing 10. The geometric relationship between the foil, the exterior of the mandrel 26 and the interior of the housing 10 should be such as to effectively eliminate paths through which exhaust gases may pass without the requisite impingement upon the catalytic metal foil.

Figure 6:
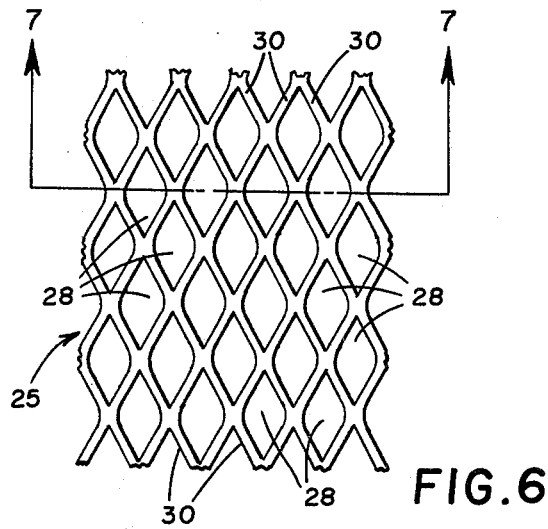
FIG. 6 is a greatly enlarged plan view of a section of the expanded metal foil.
Figure 7:
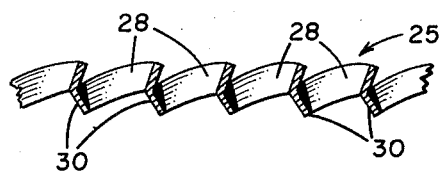
FIG. 7 is a cross-sectional view taken on line 7—7 of FIG. 6.

FIGS. 6 and 7 show the preferred form for the foil 25. As illustrated, it comprises a multiplicity of closely spaced openings 28 separated by narrow, gas impervious portions which, in effect, form elongated strands 30. As best shown in FIGS. 6 and 7, the strand portions in intermediate rows of openings 28 are preferably inclined or twisted relative to the mean plane of the foil sheet. As can be appreciated, openings 28 are formed merely by slitting the metal foil and expanding it by applying tension to the foil sheet in a direction generally perpendicular to the direction of the slitting. This typically produces a twist to the intermediate foil sections as shown in FIG. 7.

According to an aspect of the invention, the expanded foil sheet preferably has a thickness in the range of from .001 inches to .01 inches and a surface area to mass ratio of between approximately 16 and 2 square inches per gram as determined by linear dimension only. Additional surface area can be obtained by conventional subtractive, additive or other roughening surface treatment.

Referring again to FIGS. 1 and 2, it will be seen that the expanded foil 25 is tightly wound upon the mandrel 26 is stacked, ever increasing convolutions. The strip is wound tightly on the mandrel so that the resulting foil arrangement has a large void volume and a density of in the range of approximately 2 to 12 percent the density of an equivalent solid volume of the metal from which the foil is made. This can vary, of course, depending upon the foil and the expanding parameters. However, merely by way of comparison, this structure has about one-tenth the mass of the prior art saddle bed. This increases the heat-up rate by about a factor of four.

Because of the nature of the foil and the winding process, the openings 28 in each layer are somewhat randomly located relative to those in adjacent layers. The resulting assembly thus provides a large number of circuitous flow paths so that as gas passes through the assembly it is continually subject to changes in flow direction resulting in repeated impingement of the gas molecules with the catalytic surface of the foil. However, because of the large number of voids and relatively low density of the foil arrangement, the back-pressure is comparatively low.

In the structural embodiment of FIGS. 1 and 2, the ends of the foil arrangement are protected by perforated metal plates 31 which are, for example, press-fitted on mandrel 26. These plates are desirable in that they prevent crushing of the ends of the foil arrangement during handling, shipping, etc. Also, under some operating conditions, the ends could possibly be damaged if the plates were not present.

The foil can be made from many different metals, alloys, and combinations thereof. The commonly assigned co-pending applications mentioned earlier describe several such combinations which are particularly suitable. In any event, at least a major portion of the surface of the foil should comprise an effective amount of $NO_x$ reducing catalyst.

Figure 3:
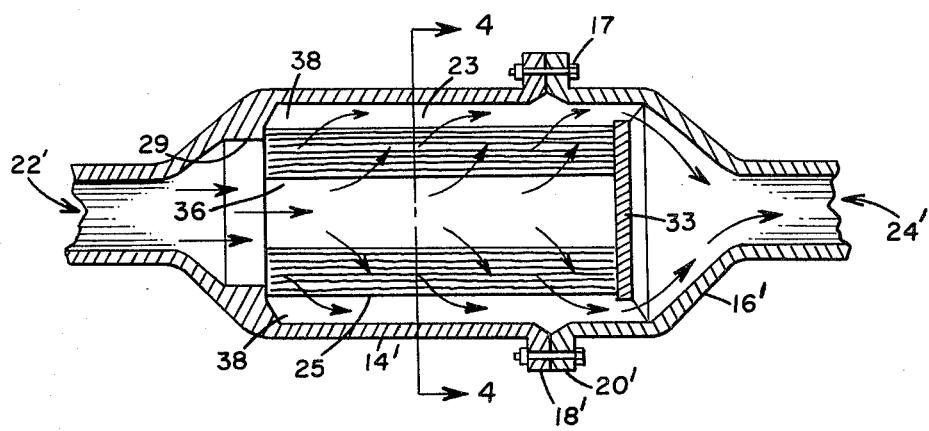
FIG. 3 is a longitudinal cross-sectional view similar to FIG. 2 but showing a modified form of the invention.

FIG. 3 shows a modified form of structure embodying the invention. In this embodiment, the housing is illustrated as generally the same as that shown in the FIGS. 1 and 2 embodiment and accordingly the same reference numerals differentiates by a prime (') suffix have been used to identify corresponding elements. A description of the FIGS. 1 and 2 element is to be taken as equally applicable unless otherwise noted. The main difference shown in the housing construction is that bell section 14' is somewhat longer than bell section 16'. Also, an internal shoulder 29 is formed within the bell section 14'.

Figure 4:
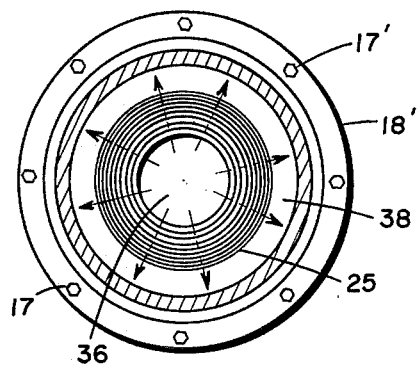
FIG. 4 is a cross-sectional view taken along line 4—4 of FIG. 3.

The expanded metal foil 25 is tightly wound into a spiral assembly having an open inner diameter 36 which is of a diameter approximately equal to the inlet 22. The outer diameter of the assembly is, however, less than the inner diameter of the housing. This provides an open flow passage 38 circumferentially about the spiral wound foil arrangement. The catalytic structure is positioned in the housing and a baffle or plate extends across the end of the foil arrangement as shown. The plate 33 is suitable supported from the housing in a manner which will not greatly impede flow about the edges of the plate but will prevent flow axially through the mass. As it can be appreciated, in this embodiment, the gas entering the housing is caused to flow generally radially through the mass as shown in FIG. 4.

Figure 5:
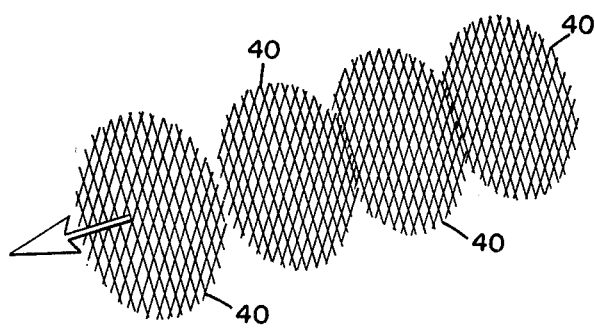
FIG. 5 is an exploded pictorial view showing a modified form of foil mass for the assembly.

FIG. 5 illustrates a third manner in which the foil mass can be formed. In this embodiment, the foil arrangement is formed from a multiplicity of discs or wafers 40 of the foil 25. The discs are merely tightly stacked together in aligned relationship. The openings 28 in each disc are, however, preferably randomly located relative to those in adjacent discs. The flow arrow in FIG. 5 shows gas flow as taking place axially through the mass. This is preferred but the foil arrangement could also be used in environments where flow takes place through its diameter.

The total surface area required for a given installation will, of course, depend upon the catalyst used, the quantity of $NO_x$ in the exhaust gas, the volume of gas, and various other operating conditions. In any case, it will be recognized that the mass of catalytic structure necessary to produce a given required surface area is much reduced relative to prior art structures through the application of the concepts herein disclosed.

Figure 8:
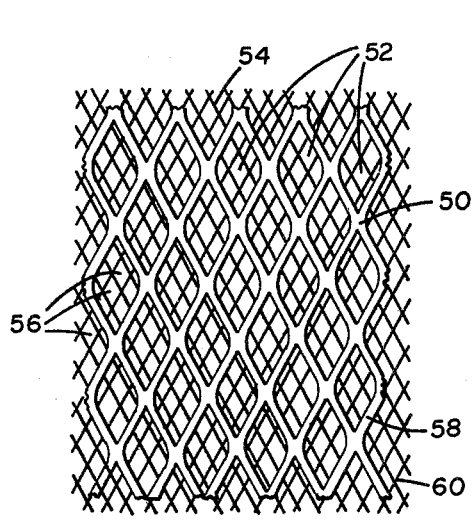
FIG. 8 is an enlarged plan view showing a sheet of expanded metal foil positioned on top of another sheet of expanded metal foil having smaller openings therein.

FIG. 8 shows a sheet of expanded metal foil 50 having openings 52 therein positioned on top of another sheet of expanded metal foil 54. Sheet 54 has openings 56 therein which are smaller than those openings found in sheet 50. These so-positioned sheets of expanded metal foil are then formed into a suitable configuration. For example, they can be rolled into a helical coil with the result being that the strands 58 of sheet 50 do not nest or stack with the strands 60 of sheet 54. Accordingly, more catalyst coated surface is exposed to the $NO_x$ gases which are directed therethrough and therefore a more efficiently operating catalyst is achieved.

Figure 9:
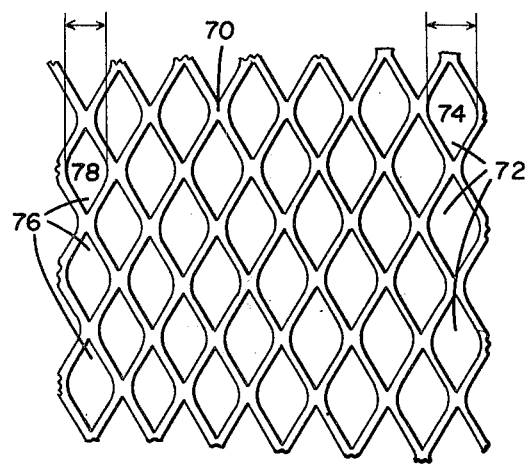
FIG. 9 is an enlarged plan view showing a sheet of expanded metal foil which has been distorted so that it has openings therein of different sizes.

FIG. 9 shows a sheet of expanded metal foil 70 which has been distorted so that there are different size openings in the same sheet of foil. As can be seen from this drawing, openings ;72 in sheet 70 are larger in width at point 74 than are openings 76 at point 78. This pattern is accomplished by applying a suitable tensional force to the sheet of expanded metal foil. When this sheet of expanded metal foil is formed into the desired configuration, such as a helical coil having overlaid ever increasing convolutions of foil, juxtapositioned layers of foil do not stack or nest with each other. Accordingly, more catalyst surface is exposed to the $NO_x$ gases which are directed therethrough with the result being that a more efficiently operating catalyst is obtained.

With regard to the embodiments of the invention illustrated in FIGS. 8 and 9, it will be readily apparent to those skilled in the art that various modifications thereof may be made which provided the same general result. For example, three or more sheets of expanded metal foil having different size openings therein may be positioned on top of each other and then formed in the desired catalyst structure. In addition, a sheet of expanded metal foil may be distorted in either a regular or irregular manner. For example, only a portion of the sheet of expanded metal foil may be distorted or the sheet of metal foil may be distorted in a warped manner.

Figure 10:
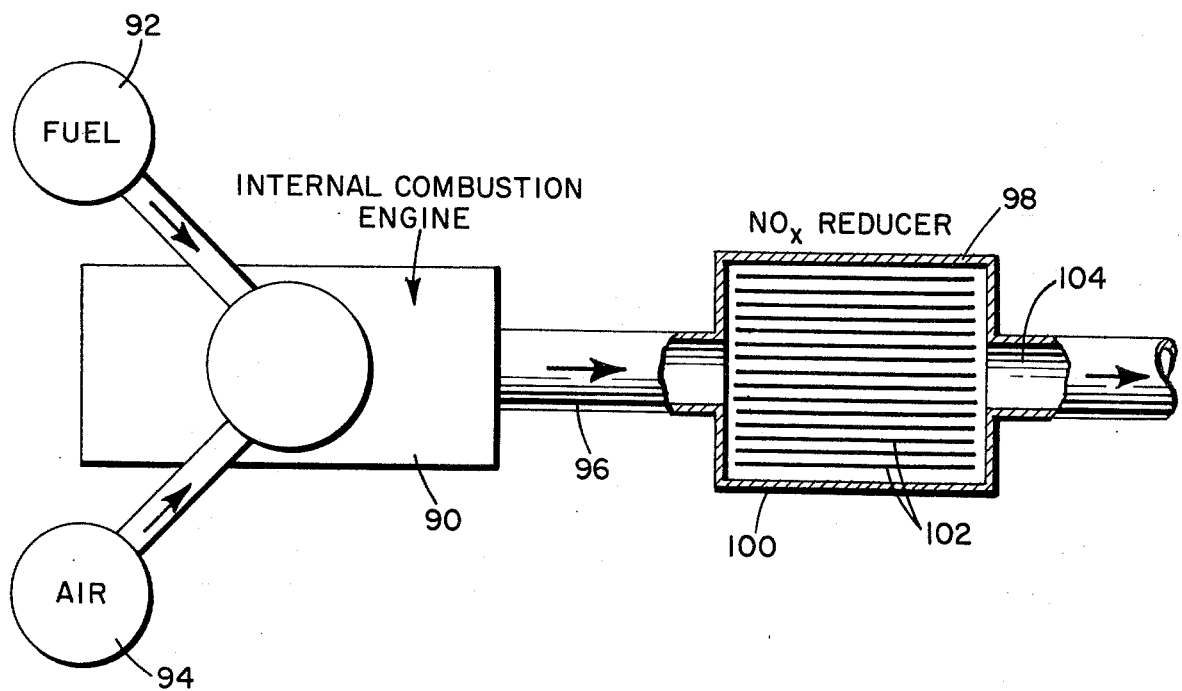
FIG. 10 is a diagrammatical illustration of the system of the invention.

IN FIG. 10 there is shown the system of the invention for catalytically reducing $NO_x$ found in the exhaust stream of the internal combustion engine which system includes an internal combustion engine 90 having communication therewith a source of fuel 92 and a source 94 of an oxidant (oxygen from air) for the fuel. During operation of the internal combustion engine 90 exhaust gases are generated which pass through the manifold or conduit 96 into the $NO_x$ reducing catalyst assembly or apparatus 98 which includes a housing 100 having a $NO_x$ reducing catalyst structure 102 composed of a sheet or sheets of expanded thin metal foil of the type and composition described herein with a suitable nickel-copper $NO_x$ reducing catalyst material deposited on the surface thereof positioned therein. The exhaust gases, after $NO_x$ reduction, then exit from port 104. The so-treated gases are characterized by the fact that a significant amount of $NO_x$ has been removed therefrom.

In the dual bed system, after the $NO_x$ reduction treatment, the exhaust gases are then brought into contact with an oxidation catalyst to remove carbon monoxide and gaseous hydrocarbons therefrom. As such oxidation catalysts are well known in the art they will not be discussed herein in detail.

In the preferred practice of the system of the invention the internal combustion engine is operated in a manner such that the exhaust gases therefrom contain relatively low amounts of unreacted oxygen. Preferably less than 1 volume percent of unreacted oxygen is present. Usually, this is accomplished by operating the engine with an air/fuel ratio on the rich side of stoichiometric (rich referring to excess fuel) which is primarily achieved by adjusting the carburetion setting. It is also contemplated to utilize fuel injection as wellas other conventional means to supply the engine with the necessary amounts of fuel and oxidant therefor. In the preferred practice of the system of the instant invention it is generally desirable to operate the internal combustion engine in a manner such that the air/fuel ratio generally ranges from about 13.8 to 1 to about 14.5 to 1. However, it will be appreciated by those skilled in the art that depending on the specific fuel utilized, the type of catalyst employed and the temperature at which the gases contact the concerned caralyst this ratio may vary slightly. In general, it can be stated that the ratio of carbon monoxide to oxygen found in the exhaust gas should range from about two to one to about six to one. Clearly, a net reducing atmosphere is to be provided.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an article for catalytically reducing oxides of nitrogen found in exhaust gases emanating from an internal combustion engine comprising:
    a housing adapted to be mounted in the exhasut system of an internal combustion engine; and
    a catalytic structure means effective to reduce $NO_x$ placed in said housing and sized such that a major portion of the gases passing through said housing must pass through said catalytic structure means, the improvement comprising said catalytic structure means including a plurality of sheets of expanded thin metal foil having an $NO_x$ reducing catalyst on the surface thereof wherein at least one sheet of said expanded metal foil has at least some openings therein which are of a different size than at least some openings in another sheet of expanded metal foil in face-to-face juxtaposition therewith.

2. The article of claim 1 wherein said catalytic structure means is in the form of a helical coil formed by winding at least two sheets of expanded metal foil juxtaposed one on top of the other, one of said sheets having smaller openings than those openings found in the other sheet whereby the strands of one sheet do not stack or nest with the strands of the juxtapositioned sheet.

3. The article of claim 1 wherein portions of material between the openings of said sheets of expanded metal foil are twisted and/or inclined relative to the mean plane of the foil sheet.

4. The article of claim 1 wherein said sheets of expanded metal foil comprise a corrosion resistant nickel-chromium substrate having a surface layer comprising an alloy of copper and nickel.

5. The article of claim 1 wherein said foils have a surface area to mass ratio in the range of about 2 to 16 inches per gram as determined by linear dimension only.

6. In an article for catalytically reducing oxides of nitrogen found in exhaust gases emanating from an internal combustion engine comprising:
    a housing adapted to be mounted in the exhaust system of an internal combustion engine; and
    a catalytic structure means effective to reduce $NO_x$ placed in said housing and sized such that a major portion of the gases passing through said housing must pass through said catalytic structure means, the improvement comprising said catalytic structure means comprising a plural layer structure including an expanded thin metal foill sheet having an $NO_x$ reducing catalyst on the surface thereof with said sheet having opening therein at least some of which are of different size the layers of said plural layer structure being in face-to-face juxtaposition with each other.

7. The article of claim 6 wherein said expanded metal structure comprises said sheet of expanded metal foil wound in the form of a helical coil.

8. The article of claim 6 wherein said expanded metal structure comprises a plurality of stacked sheets of expanded metal foil positioned one on top of the other.

9. The article of claim 6 wherein said expanded metal foil comprises a corrosion resistant nickel-chromium substrate having a surface layer comprising an alloy of copper and nickel.

10. The article of claim 6 wherein said foil has a surface area to mass ratio in the range of about 2 to 16 inches per gram as determined by linear dimension only.

* * * * *